Jan. 12, 1943.  H. C. BOARDMAN  2,307,915
SUPPORT FOR PIPES
Filed March 7, 1942
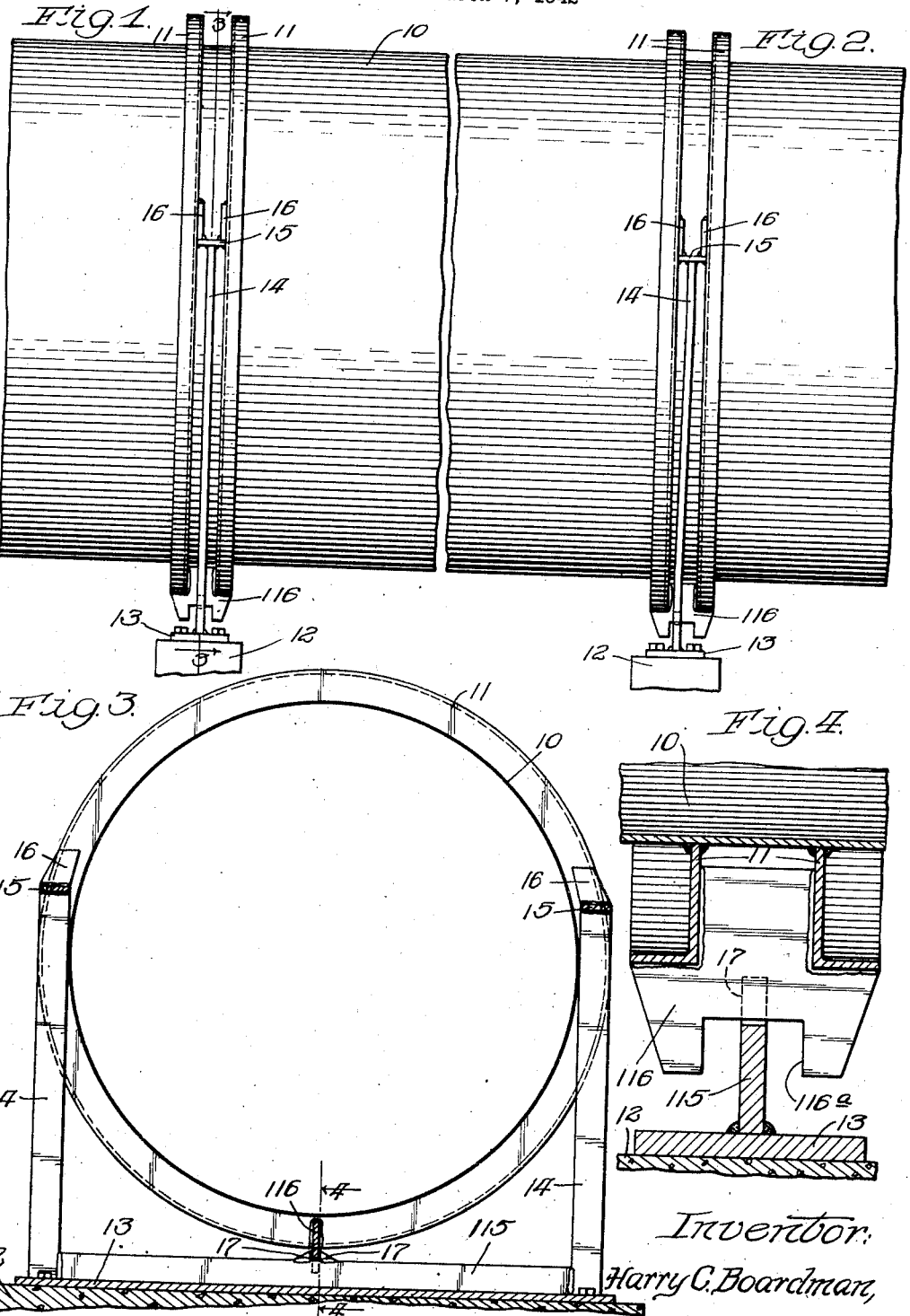
Inventor:
Harry C. Boardman,
By Christen, Wiles, Davies & Hirsch, Attys.

Patented Jan. 12, 1943

2,307,915

UNITED STATES PATENT OFFICE 2,307,915

SUPPORT FOR PIPES

Harry C. Boardman, Chicago, Ill., assignor to Chicago Bridge & Iron Company, a corporation of Illinois Application March 7, 1942, Serial No. 433,753

7 Claims. (Cl. 248—49)

This invention relates to improvements in supports for pipes and more especially a support for a large horizontal pipe line. It has long been the custom of engineers to provide sliding or rolling supports. My new design is intended to eliminate these types and substitute a type using slender columns of sufficient flexibility to permit longitudinal movements of the pipe due to temperature variations.

For example, my improved support may be used for a horizontal water pipe such as a penstock, having a diameter of 9 feet or more, where the longitudinal movements due to temperature variations may equal or exceed ⅜ inch, each side of the mid-position.

Other features and advantages will appear more fully as I proceed with my specification.

In that form of device embodying the features of my invention shown in the accompanying drawing, Fig. 1 is a view in side elevation; Fig. 2 is a similar view showing the parts in an altered position; Fig. 3 is a view taken as indicated by the line 3 of Fig. 1; and Fig. 4 is an enlarged view taken as indicated by the line 4 of Fig. 3.

As shown in the drawing, 10 indicates a section of the pipe to be supported. 11, 11 indicates 2 angle iron rings encircling the pipe, the lower substantially half portions of the rings serving as saddles in which the pipe rests. Instead of providing merely the lower portions of the rings, I prefer to complete the rings as shown.

12 indicates a suitable concrete base extending transversely of the pipe with a base plate 13 thereon. At the ends of the base plate 13 are provided the vertical posts 14, the upper ends of which are provided with bearing plates 15 on which rest the lugs 16 welded to the rings 11, 11. The lugs 16 are also preferably welded to the bearing plate 15. The posts 14 have a relatively greater dimension transversely of the pipe than longitudinally thereof so that they will be longitudinally flexible. For example, the posts 14 may be made of material substantially 6 inches by 2¼ inches and be substantially 6 feet 8 inches high where the inside diameter of the pipe to be supported is substantially 9 feet. With such construction, the posts 14, 14 are longitudinally flexible. In using the term "longitudinally" I mean in a horizontal direction parallel with the axis of the pipe to be supported. That is, the posts can flex to permit the upper ends to move horizontally as the pipe moves due to variations in temperature. This is illustrated in Figures 1 and 2. In Figure 1 the upper ends of the posts 14 are in the mid-position. In Figure 2 it will be seen that the upper ends have moved some distance to the right, causing a bending or flexing of the posts.

Extending between the posts 14, 14 and fastened on the upper surface of the plate 13 is a strut 115. The rings 11, 11 at the bottom are provided with a plate 116 having a wide notch 116a embracing the strut 115. (See Figure 4.) On each side of the plate 116 there is provided a triangular stop block 17 on the strut 115. The stop blocks 17 are high enough to be engaged by the plate 116 to prevent transverse movement thereof. By "transverse" I mean in a horizontal direction at right angles to the axis of the pipe to be supported. The stop blocks 17 are close enough to the plate 116 to prevent any substantial transverse movement of said plate, but sufficient clearance is provided between the stop block 17 and the plate 116 to permit the latter to move longitudinally as the pipe moves from temperature variations. The notch 116a in the bottom of the plate 116 is also wide enough to permit such longitudinal movement.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A support for a horizontal pipe including a saddle; a base; and supporting posts from the ends of the saddle to the base, said posts being flexible in a direction parallel to the axis of the pipe.

2. A device as claimed in claim 1, with means for preventing transverse movement of the saddle.

3. A device as claimed in claim 1, with means for preventing transverse movement of the saddle, said means including a member on the base cooperating with a member on the bottom of the saddle.

4. A device as claimed in claim 1, in which the ends of the saddle are connected by an upwardly curved member forming a ring adapted to encircle the pipe.

5. A support for a horizontal pipe, including: a pair of spaced rings; a base; and supporting posts extending from the ends of the base to points between the rings at the sides thereof, said posts being flexible in a direction parallel to the axis of the pipe.

6. A device as claimed in claim 5, with means for preventing transverse movement of the rings.

7. A device as claimed in claim 5, with means for preventing transverse movement of the rings, said means including a member on the base cooperating with a member on the bottoms of the rings.

HARRY C. BOARDMAN.